United States Patent
Kurasawa

(10) Patent No.: US 8,064,017 B2
(45) Date of Patent: Nov. 22, 2011

(54) LIQUID CRYSTAL DISPLAY DEVICE AND ELECTRONIC APPARATUS

(75) Inventor: Hayato Kurasawa, Matsumoto (JP)

(73) Assignee: Sony Corporation, Tokyo (JP)

( * ) Notice: Subject to any disclaimer, the term of this patent is extended or adjusted under 35 U.S.C. 154(b) by 177 days.

(21) Appl. No.: 11/896,069

(22) Filed: Aug. 29, 2007

(65) Prior Publication Data

US 2008/0055527 A1  Mar. 6, 2008

(30) Foreign Application Priority Data

Sep. 4, 2006 (JP) ................................. 2006-239408
Jul. 25, 2007 (JP) ................................. 2007-193405

(51) Int. Cl.
*G02F 1/1333* (2006.01)

(52) U.S. Cl. ........ 349/123; 349/124; 349/125; 349/126; 349/127

(58) Field of Classification Search ........... 349/123–127
See application file for complete search history.

(56) References Cited

U.S. PATENT DOCUMENTS

| | | | |
|---|---|---|---|
| 6,452,659 B1 * | 9/2002 | Akiyama et al. | ............. 349/148 |
| 6,456,351 B1 | 9/2002 | Kim et al. | |
| 6,645,576 B2 | 11/2003 | Iwakabe et al. | |
| 6,888,601 B2 * | 5/2005 | Asai et al. | ..................... 349/141 |
| 7,256,843 B2 | 8/2007 | Iwakabe et al. | |
| 7,355,665 B2 * | 4/2008 | Ban et al. | ....................... 349/141 |
| 2002/0004108 A1 | 1/2002 | Iwakabe et al. | |
| 2005/0088598 A1 | 4/2005 | Matsumori et al. | |
| 2006/0061719 A1 | 3/2006 | Tomioka et al. | |
| 2007/0002247 A1 * | 1/2007 | Lee | ............................... 349/141 |
| 2007/0035686 A1 | 2/2007 | Iwakabe et al. | |

FOREIGN PATENT DOCUMENTS

| | | |
|---|---|---|
| JP | A-2001-354968 | 12/2001 |
| JP | A-2002-365657 | 12/2002 |
| JP | A 2004-206091 | 7/2004 |
| KR | 10-2003-0060716 A | 7/2003 |
| KR | 10-2006-0087725 A | 8/2006 |

\* cited by examiner

*Primary Examiner* — Phu Vu
(74) *Attorney, Agent, or Firm* — K&L Gates LLP

(57) ABSTRACT

Disclosed herein is a liquid crystal display device in which a plurality of electrodes is provided on one of a plurality of substrates with a liquid crystal layer interposed therebetween and liquid crystal molecules configuring the liquid crystal layer are driven by an electric field generated between the pair of electrodes, wherein the one substrate has an alignment film which contacts the liquid crystal layer to regulate an alignment direction of the liquid crystal molecules and is provided so as to cover at least one of the pair of electrodes, and wherein the thickness of the alignment film is larger than that of at least one of the electrodes contacting the alignment film.

8 Claims, 10 Drawing Sheets

LIQUID CRYSTAL DISPLAY DEVICE AND ELECTRONIC APPARATUS

The entire disclosure of Japanese Patent Application Nos. 2006-239408, filed Sep. 4, 2006 and 2007-193405, filed Jul. 25, 2007 are expressly incorporated by reference herein.

BACKGROUND

1. Technical Field

The present invention relates to a liquid crystal display device using a lateral electric field drive system and an electronic apparatus including the same.

2. Related Art

In order to realize a wide viewing angle of a liquid crystal display device, a system for generating an electric field in a liquid crystal layer toward a substrate direction and controlling alignment of liquid crystal molecules (hereinafter, referred to as a lateral electric field system) is known. Examples of the lateral electric field system include an in-plane switching (IPS) system and a fringe-field switching (FFS) system.

In general, in a lateral electric field liquid crystal display device, a pair of electrodes for driving a liquid crystal layer is provided on one of a pair of substrates having the liquid crystal layer interposed therebetween. In a FFS liquid crystal display device, one of a pair of electrodes is provided in the vicinity of the surface of a liquid crystal side of a substrate and an alignment film is formed thereon. This alignment film is formed by coating an organic material such as polyimide on one electrode and performing a rubbing process of rubbing the organic material with a rubbing cloth. However, one electrode includes a plurality of band-shaped electrodes with gaps provided therebetween. In addition, since a surface of the substrate on which the alignment film is formed has a fine step difference, a step difference portion is formed in the alignment film due to the step difference. Accordingly, a rubbing process is non-uniformly performed on the step difference portion and the other points and thus light leakage or decrease in alignment regulating force occurs.

Accordingly, a method of forming an alignment film by an optical alignment process using an optical reactive polyimide as an alignment film has been suggested (see, for example, JP-2004-206091). In this alignment process, polarized ultraviolet rays are irradiated onto the surface of the optical reactive polyimide such that an alignment direction according to polarization is formed without being influenced by the fine step difference.

However, even in this alignment process, the following problems occur. That is, in the optical alignment process, the alignment regulating force of liquid crystal molecules due to the alignment film is small and it is difficult to uniformly perform the alignment process. In addition, productivity is low compared with the rubbing process using the rubbing cloth.

SUMMARY

An advantage of some aspects of the invention is that it provides a liquid crystal device including an alignment film having a sufficient alignment regulating force due to an alignment process being performed with sufficient uniformity and an electronic apparatus including the same.

According to an aspect of the invention, there is provided a liquid crystal display device in which a plurality of electrodes is provided on one of a plurality of substrates with a liquid crystal layer interposed therebetween and liquid crystal molecules configuring the liquid crystal layer are driven by an electric field generated between the pair of electrodes, wherein the one substrate has an alignment film which contacts the liquid crystal layer to regulate an alignment direction of the liquid crystal molecules and is provided so as to cover at least one of the pair of electrodes, and wherein the thickness of the alignment film is larger than that of at least one of the electrodes contacting the alignment film.

In the invention, since the thickness of the electrode contacting the alignment film is larger than that of the alignment film, the flatness of the alignment film is improved, a rubbing process is uniformly performed, and display burn-in due to an alignment regulation failure can be reduced.

That is, since the thickness of the alignment film is larger than that of the electrode contacting the alignment film, the step difference of the upper surface of the alignment film between the region in which the electrode is formed and the region in which the electrode is not formed is reduced by the leveling effect of the coated alignment film when the alignment film is formed on the electrode. In addition, since the flatness of the upper surface of the alignment film is improved, a desired rubbing process can be uniformly performed. Accordingly, the alignment film has a sufficient alignment regulating force for liquid crystal molecules. Accordingly, since a lateral electric field is generated in the liquid crystal layer, the sufficient alignment regulating force can be maintained although charges are stored in the vicinities of the members of a path of the generated electric field. Thus, an alignment regulation failure due to the charging of the alignment film is reduced and thus display burn-in is prevented.

Accordingly, display burn-in is reduced and thus good image display can be performed.

In the liquid crystal display device according to the invention, the thickness of the at least one of the electrodes contacting the alignment film may be 100 nm or less, and the thickness of the alignment film may be 40 nm to 150 nm.

In the invention, since the thickness of the electrode contacting the alignment film is 100 nm or less to reduce the step difference due to the electrode, it is possible to maintain the flatness of the alignment film formed on the electrode. Since the thickness of the alignment film is 40 nm to 150 nm, it is possible to reduce the step difference portion formed by the electrode.

In the liquid crystal display device according to the invention, the thickness of the at least one of the electrodes contacting the alignment film may be 55 nm or less, and the thickness of the alignment film may be 80 nm to 125 nm.

In the invention, since the thickness of the electrode contacting the alignment film is 55 nm or less to reduce the step difference due to the electrode, it is possible to maintain the flatness of the alignment film formed on the electrode. Since the thickness of the alignment film is 80 nm to 125 nm, it is possible to further reduce the step difference portion formed by the electrode.

In the liquid crystal display device according to the invention, a difference between a sum of the thickness of the at least one of the electrodes contacting the alignment film and the thickness of the alignment film formed thereon and the thickness of the alignment film may be less than 60 nm.

In the invention, since the difference between the sum of the thickness of the electrode contacting the alignment film and the thickness of the alignment film formed thereon and the thickness of the alignment film in a region in which the electrode is not formed is less than 60 nm, it is possible to sufficiently reduce the step difference of the upper surface of the alignment film contacting the electrode.

In the liquid crystal display device according to the invention, a difference between a sum of the thickness of the at least one of the electrodes contacting the alignment film and the thickness of the alignment film formed thereon and the thickness of the alignment film may be less than 15 nm.

In the invention, since the difference between the sum of the thickness of the electrode contacting the alignment film and the thickness of the alignment film formed thereon and the thickness of the alignment film in a region in which the electrode is not formed is less than 15 nm, it is possible to more sufficiently reduce the step difference of the upper surface of the alignment film contacting the electrode.

In the liquid crystal display device according to the invention, the one electrode contacting the alignment film may have a plurality of band-shaped portions electrically connected to each other, and the other electrode may include a plane region in which the one electrode is formed, may have a larger area than the one electrode, and may be opposed to the one electrode with an insulating layer interposed therebetween.

In the invention, since the alignment film having a sufficient alignment regulating force and high flatness is formed without being influenced by a step difference structure formed by the plurality of band-shaped electrodes, it is possible to suppress display burn-in due to an alignment regulation failure.

In the liquid crystal display device according to the invention, the one electrode may have a connection portion for connecting one end of each of the plurality of band-shaped portions with one another, and the other end of each of the plurality of band-shaped portions may be an open end.

In this invention, since the other end of each of the band-shaped portions is the open end, an aperture ratio is enhanced.

In the liquid crystal display device according to the invention, curved portions, which become further away from a central line of a central portion with increasing proximity to both ends of the band-shaped portions, may be formed at the both ends of the band-shaped portions.

In this invention, it is possible to reduce a display failure such as a reverse twist domain in the vicinities of the both ends of the band-shaped portions.

In the liquid crystal display device according to the invention, the other electrode may be connected to a driving element for controlling the electric field between the pair of electrodes.

In the invention, one electrode which does not contact the driving element is provided to be closer to the liquid crystal layer than the other electrode connected to the driving element.

According to another aspect of the invention, there is provided an electronic apparatus comprising the liquid crystal display device.

In the invention, since the thickness of the electrode contacting the alignment film is larger than that of the alignment film, it is possible to reduce display burn-in and to perform good image display, as described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
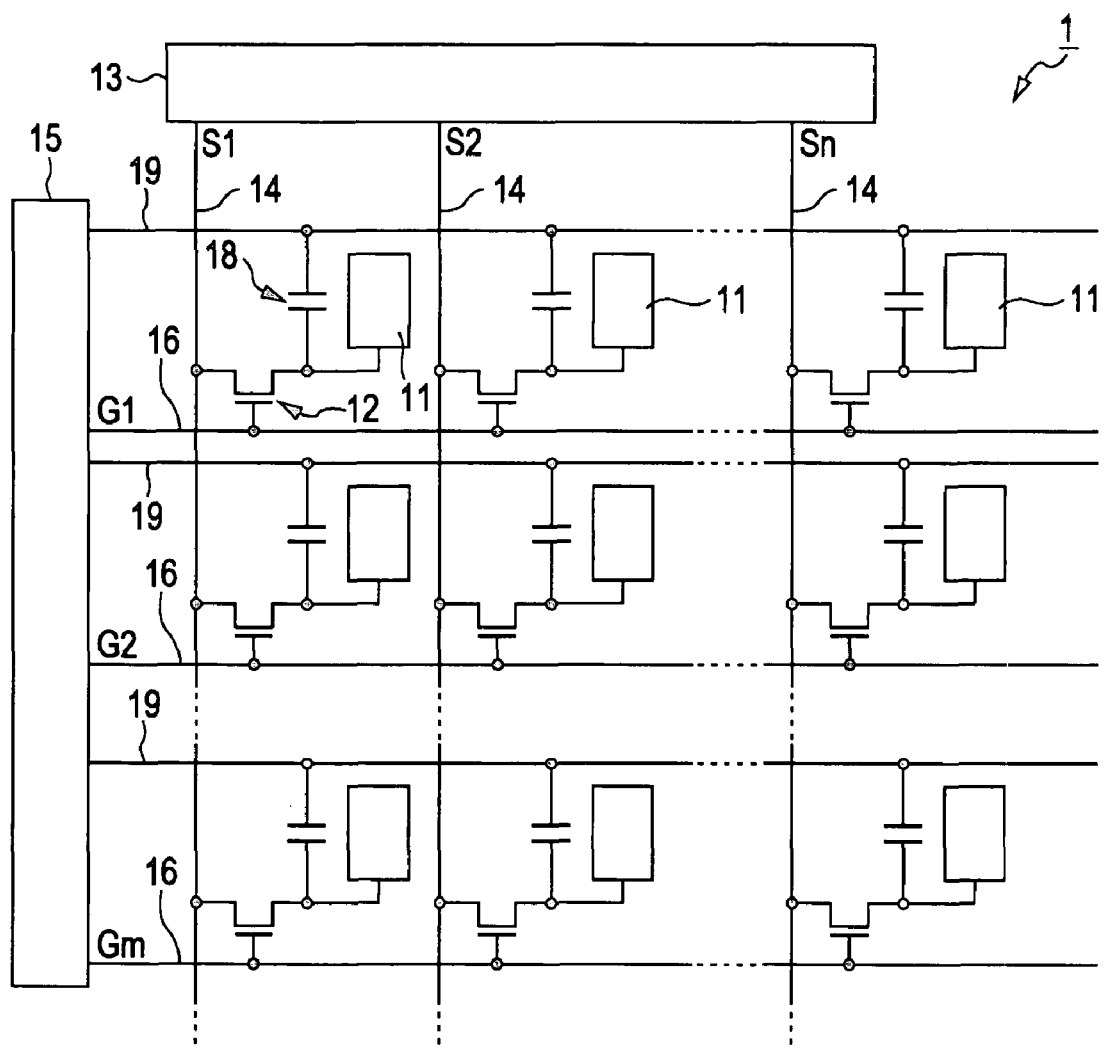
FIG. 1 is a circuit diagram showing a liquid crystal display device according to a first embodiment of the invention.
Figure 2:
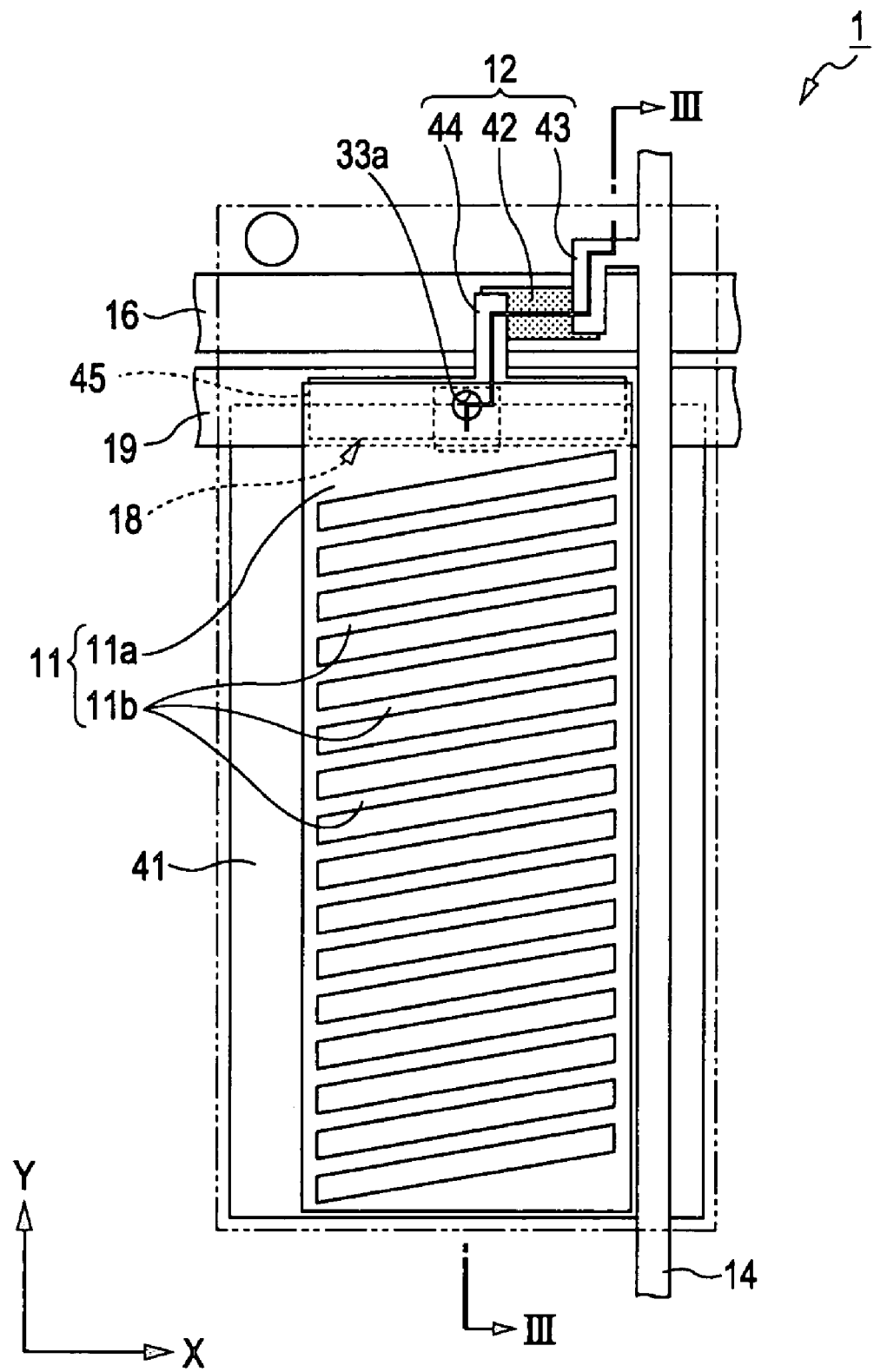
FIG. 2 is a plan view showing a sub pixel region of the liquid crystal display device.
Figure 3:
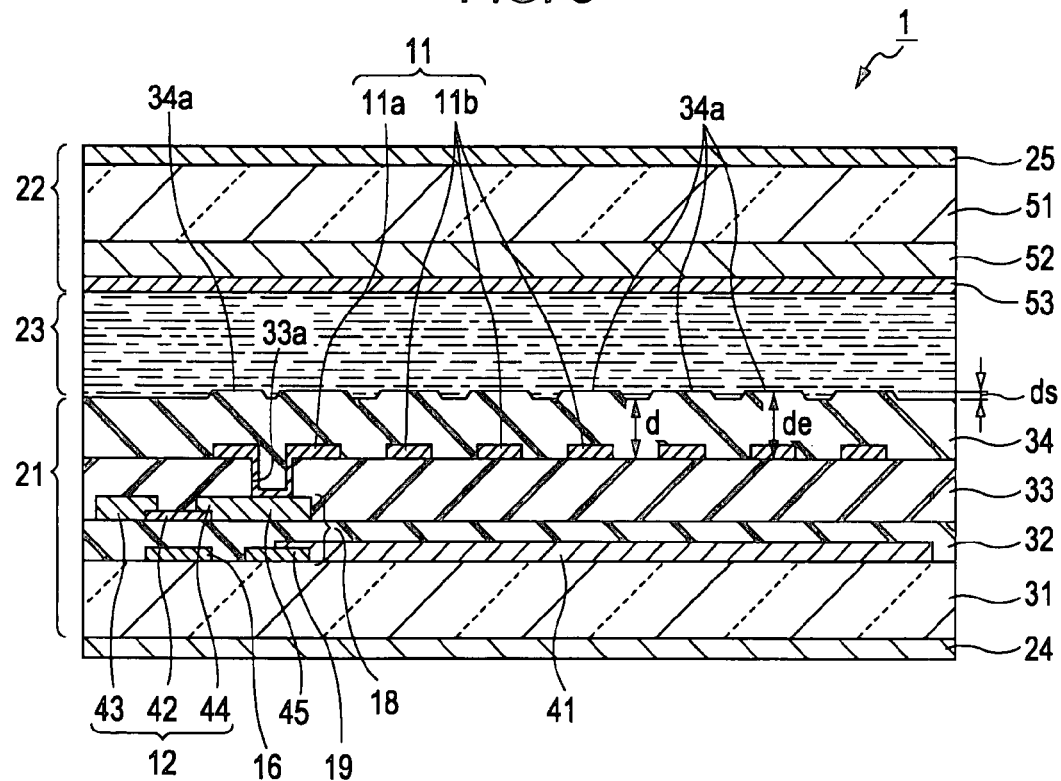
FIG. 3 is a cross-sectional view taken along line III-III of FIG. 2.
Figure 4:
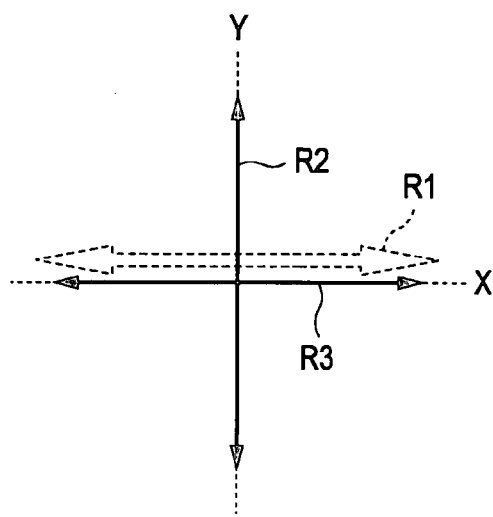
FIG. 4 is a view showing an arrangement of an optical axis of FIG. 2.

Hereinafter, a liquid crystal display device according to a first embodiment of the invention will be described with reference to the accompanying drawings. In each view used for following description, the scale of each layer or each element is differentiated from others such that each layer or each element has a size such that it can be easily identified in the view. FIG. 1 is an equivalent circuit diagram of the liquid crystal display device, FIG. 2 is a partial enlarged plan view showing a sub pixel region of the liquid crystal display device, FIG. 3 is a cross-sectional view taken along line III-III of FIG. 2, and FIG. 4 is a view showing an arrangement of an optical axis of FIG. 2.

Liquid Crystal Display Device

The liquid crystal display device 1 according to the present embodiment is a FFS liquid crystal display device in which three sub pixels for outputting color light of red (R), green (G) and blue (B) configure one pixel. Here, a display region which is a minimum unit of display is called a "sub pixel region" and a display region configured by one set of sub pixels (R, G and B) is called a "pixel region".

First, the schematic configuration of the liquid crystal display device 1 will be described. As shown in FIG. 1, in the liquid crystal display device 1, a plurality of sub pixel regions configuring the pixel display region are arranged in a matrix.

In each of the plurality of sub pixel regions configuring the pixel display region of the liquid crystal display device 1, a pixel electrode (first electrode) 11 and a thin-film transistor (TFT) element (driving element) 12 for switching the pixel electrode 11 are formed. A source of the TFT element 12 is connected to a data line 14 which extends from a data line driving circuit 13 provided in the liquid crystal display device 1, a gate thereof is connected to a scan line 16 which extends from a scan line driving circuit 15 provided in the liquid crystal display device 1, and a drain thereof is connected to the corresponding pixel electrode 11.

The data line driving circuit 13 supplies image signals S1, S2, . . . , and Sn to the sub pixel regions through the data lines 14. The scan line driving circuit 15 supplies scan signals G1, G2, . . . , and Gm to the sub pixel regions through the scan lines

16. Here, the data line driving circuit 13 may line-sequentially supply the image signals S1 to Sn in this order and may supply the image signals S1 to Sn to groups including a plurality of adjacent data lines 14. The scan line driving circuit 15 line-sequentially supplies the scan signals G1 to Gm in pulses at a predetermined timing.

In the liquid crystal display device 1, the TFT elements 12 which are the switching elements are turned on in only a predetermined period by inputting the scan signals G1 to Gm such that the image signals S1 to Sn supplied from the data lines 14 are recorded in the pixel electrodes 11 at predetermined timings. The image signals S1 to Sn each having a predetermined level and recorded in the liquid crystal through the pixel electrodes 11 are held in a predetermined period between the pixel electrodes 11 and a common electrode 41 with the liquid crystal interposed therebetween. Here, in order to prevent the held image signals S1 to Sn from leaking, storage capacitors 18 are provided in parallel to liquid crystal capacitors formed between the pixel electrodes 11 and the common electrode 41. Each storage capacitor 18 is provided between the drain of the corresponding TFT element 12 and a capacitive line 19.

Next, the detailed configuration of the liquid crystal display device 1 will be described with reference to FIGS. 2 and 3. In FIG. 1, a counter substrate is not shown. In FIG. 3, band-shaped electrodes configuring the pixel electrode are omitted.

As shown in FIG. 3, the liquid crystal display device 1 includes a device substrate (one substrate) 21, a counter substrate (other substrate) 22 which faces the device substrate 21, a liquid crystal layer 23 interposed between the device substrate 21 and the counter substrate 22, a polarization plate 24 provided on an outer surface (the side opposite the liquid crystal layer 23) of the device substrate 21, and a polarization plate 25 provided on an outer surface of the counter substrate 22. In the liquid crystal device 1, illumination light is irradiated from the outer surface of the device substrate 21.

In the liquid crystal display device 1, a seal material (not shown) is provided along the edges of the region in which the device substrate 21 and the counter substrate 22 face each other. The liquid crystal layer 23 is sealed by the seal material, the device substrate 21 and the counter substrate 22.

The device substrate 21 includes a substrate body 31 formed of a light-transmissive material such as glass, quartz or plastic, and a gate insulating film 32, an interlayer insulating film 33 and an alignment film 34, all of which are laminated on the inner surface (at the side of the liquid crystal layer 23) of the substrate body 31 in this order.

The device substrate 21 includes the scan line 16, the capacitive line 19 and the common electrode 41, all of which are provided on the inner surface of the substrate body 31; the data line 14 (shown in FIG. 2), a semiconductor layer 42, a source electrode 43, a drain electrode 44 and a capacitive electrode 45, all of which are provided on the inner surface of the gate insulating film 32; and the pixel electrode 11 provided on the inner surface of the interlayer insulating film 33.

The gate insulating film 32 is formed of a light-transmissive material having an insulating property, such as silicon nitride or silicon oxide and is provided so as to cover the scan line 16, the capacitive line 19 and the common electrode 41, all of which are formed on the substrate body 31.

Similar to the gate insulating film 32, the interlayer insulating film 33 is formed of a light-transmissive material having an insulating property, such as silicon nitride or silicon oxide and is provided so as to cover the semiconductor layer 42, the source electrode 43, the drain electrode 44 and the capacitive electrode 45, all of which are provided on the gate insulating film 32. A contact hole 33a which is a through-hole for electrical conduction between the pixel electrode 11 and the TFT element 12 is formed in a portion of the interlayer insulating film 33 which overlaps a frame portion 11a of the pixel electrode 11 and the capacitive electrode 45 in plan view.

The alignment film 34 is formed of an organic material such as polyimide and is provided so as to cover the pixel electrode 11 formed on the interlayer insulating film 33. The thickness d of the alignment film 34 is, for example, 80 nm to 125 nm. A step difference ds of the upper surface of the alignment film 34 is less than 15 nm. The thickness d of the alignment film 34 indicates the thickness of a region of the alignment film 34 which does not cover the pixel electrode 11. The step difference ds of the upper surface of the alignment film 34 indicates a difference between the sum of the thickness of the pixel electrode 11 and the thickness of the alignment film 34 formed on the pixel electrode 11 and the thickness d of the region of the alignment film 34 which does not cover the pixel electrode 11.

A step difference portion 34a is formed in the alignment film 34 by a fine step difference structure formed by the band-shaped electrodes 11b configuring the pixel electrode 11. The upper surface of the alignment film 34 is subjected to an alignment process for regulating the alignment of liquid crystal molecules configuring the liquid crystal layer 23. The alignment direction of the alignment film 34 is equal to an X axis direction as denoted by an arrow R1 shown in FIG. 4. The alignment film 34 is formed by coating the organic material so as to cover the interlayer insulating film 33 and the pixel electrode 11 formed thereon, drying and curing the organic material, and performing a rubbing process.

As shown in FIG. 2, the data line 14 extends in a Y-axis direction and the scan line 16 and the capacitive line 19 extend in an X-axis direction. Accordingly, the data line 14, the scan line 16 and the capacitive line 19 are arranged in a lattice shape in plan view.

The semiconductor layer 42 is formed of semiconductor such as amorphous silicon which is partially formed in a region overlapping the scan line 16 in plan view. In addition, as shown in FIG. 2, the source electrode 43 is a wiring line having a substantially reversed L shape in plan view and is branched from the data line 14 to be connected to the semiconductor layer 42. The drain electrode 44 is connected to a connection line 47 which extends along a side of the sub pixel region in the +Y side edge shown in FIG. 2 and is connected to the capacitive electrode 45 formed at the edge opposed to the sub pixel region through the connection line 47. The semiconductor layer 42, the source electrode 43 and the drain electrode 44 configure the TFT element 12. Accordingly, the TFT element 12 is provided in the vicinity of the intersection of the data line 14 and the scan line 16.

The capacitive electrode 45 has a substantially rectangular shape in plan view and is formed so as to overlap the +Y side edge shown in FIG. 2 of the frame portion 11a on the capacitive electrode 45 in plan view and overlap the capacitive line 19 in plan view. The capacitive electrode 45 is provided so as to overlap the +Y side edge of the frame portion 11a in plan view and is connected to the pixel electrode 11 through the contact hole 33a which penetrates through the interlayer insulating film 33. The capacitive electrode 45 and the capacitive line 19 configure the storage capacitor 18.

The pixel electrode 11 has substantially a trapezoidal shape in plan view, is formed of a light-transmissive conductive material such as indium-tin-oxide (ITO), and has a thickness of 55 nm or less. The pixel electrode 11 includes the frame portion 11a having a rectangular shape in plan view and the plurality (fifteen) of band-shaped electrodes (band-shaped portions) 11b which substantially extend in the X-axis direction and are parallel to one another with gaps interposed therebetween in the Y-axis direction. Both ends of the band-shaped electrodes 11b are connected to portions of the frame portion 11a which extend in the Y-axis direction.

The common electrode 41 has a band shape which extends in the X-axis direction shown in FIG. 2 in plan view and is formed of a light-transmissive conductive material such as ITO similarly to the pixel electrode 11. The common electrode 41 is provided at the side further separated from the liquid crystal layer 23 than the pixel electrode 11, that is, the side of the substrate body 31 of the pixel electrode 11 (between the pixel electrode 11 and the substrate body 31). A predetermined voltage used for driving the liquid crystal layer 23 or 0 V is applied to the common electrode 41 or a predetermined voltage or another voltage different from the predetermined voltage is applied to the common electrode 41 in periods (in each frame period or field period).

As described above, the pixel electrode 11 and the common electrode 41 are provided with the gate insulating film 32 and the interlayer insulating film 33 configuring an insulating layer interposed therebetween. The gap between the band-shaped electrodes 11b configuring the pixel electrode 11 is smaller than the thickness of the liquid crystal layer 23 or the width of the pixel electrode 11. Accordingly, the pixel electrode 11 and the common electrode 41 configure a FFS electrode structure.

As shown in FIG. 3, the counter substrate 22 is formed of a light-transmissive material such as glass, quartz or plastic and includes a color filter layer 52 and an alignment film 53, both of which are sequentially laminated on the inner surface of the device body 51 (on the side of the liquid crystal layer 23).

The color filter layer 52 is provided in correspondence with the sub pixel region, is formed of, for example, acrylic, and contains a color material corresponding to a display color of each sub pixel. A light-shielding film (not shown) is provided inside the color filter layer 53 so as to overlap the TFT element 12 or the data line 14, the scan line 16 and the capacitive line 19 provided on the device substrate 21 in plan view.

The alignment film 53 is formed of an inorganic material such as silicon oxide or an organic material such as polyimide and the alignment direction thereof is identical to that of the alignment film 34.

Polarization plates 24 and 25 are provided such that the transmission axes thereof are perpendicular to each other. That is, the transmission axis of the polarization plate 23 is in the Y-axis direction as denoted by an arrow R2 shown in FIG. 4 and the transmission axis of the polarization plate 25 is in the X-axis direction perpendicular to the transmission axis of the polarization plate 23 as denoted by an arrow R3.

Operation of Liquid Crystal Display Device

Next, the operation of the liquid crystal display device 1 having the above-described configuration will be described.

The liquid crystal display device 1 according to the present embodiment is a liquid crystal display device using a lateral electric field drive system such as an FFS system, in which the image signal (voltage) is supplied to the pixel electrodes 11 through the TFT elements 12 to generate an electric field between the pixel electrodes 11 and the common electrode 41 in the direction of the surface of the substrate such that the liquid crystal is driven by this electric field. The liquid crystal display device 1 performs display by changing transmissivity of each sub pixel region.

That is, in a state in which a voltage is not applied to the pixel electrodes 11, the liquid crystal molecules configuring the liquid crystal layer 23 are horizontally aligned in a direction denoted by an arrow R1 shown in FIG. 4. When the electric field is generated in the liquid crystal layer 23 in a direction perpendicular to an extension direction of the band-shaped electrodes 11b configuring the pixel electrodes 11 through the pixel electrodes 11 and the common electrode 41, the liquid crystal molecules are aligned in this direction.

In the liquid crystal display device 1, illumination light passes through the polarization plate 24 to be converted into light which is linearly polarized in the direction of the transmission axis of the polarization plate 24 and is incident to the liquid crystal layer 23.

If the liquid crystal layer 23 is in an off state (non-selected state), the linearly polarized light incident to the liquid crystal layer 23 is emitted from the liquid crystal layer in the same polarization state as the incident light. This linearly polarized light is absorbed to the polarization plate 25 having the transmission axis perpendicular to that of the linearly polarized light such that the sub pixel region performs dark display.

In contrast, if the liquid crystal layer 23 is in an on state (selected state), a predetermined phase difference (one-half wavelength) is given to the linearly polarized light incident to the liquid crystal layer 23 by the liquid crystal layer 23 such that the linearly polarized light is converted into linearly polarized light which is rotated from the polarization direction of the incident light by 90 degrees and is emitted from the liquid crystal layer 23. Since linearly polarized light is parallel to the transmission axis of the polarization plate 25, the linearly polarized light passes through the polarization plate to be viewed as display light and the sub pixel region performs bright display.

As described above, the liquid crystal display device 1 according to the present embodiment is a liquid crystal display device using a normally black mode in which the dark display is realized in the off state.

Figure 5A:
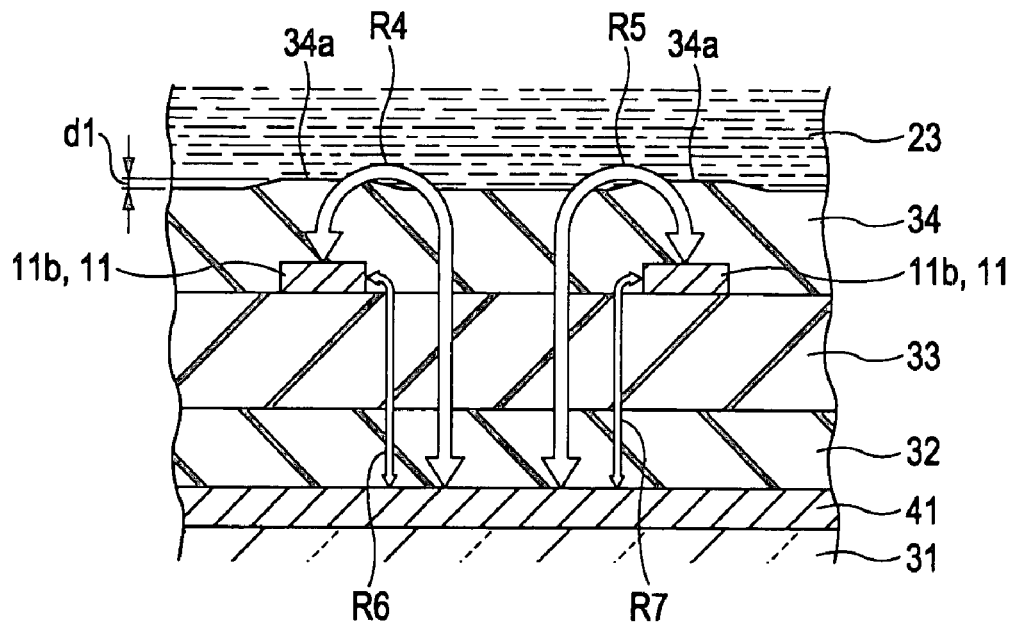
FIG. 5 is a cross-sectional view explaining a state of generating an electric field of FIG. 3.
Figure 5B:
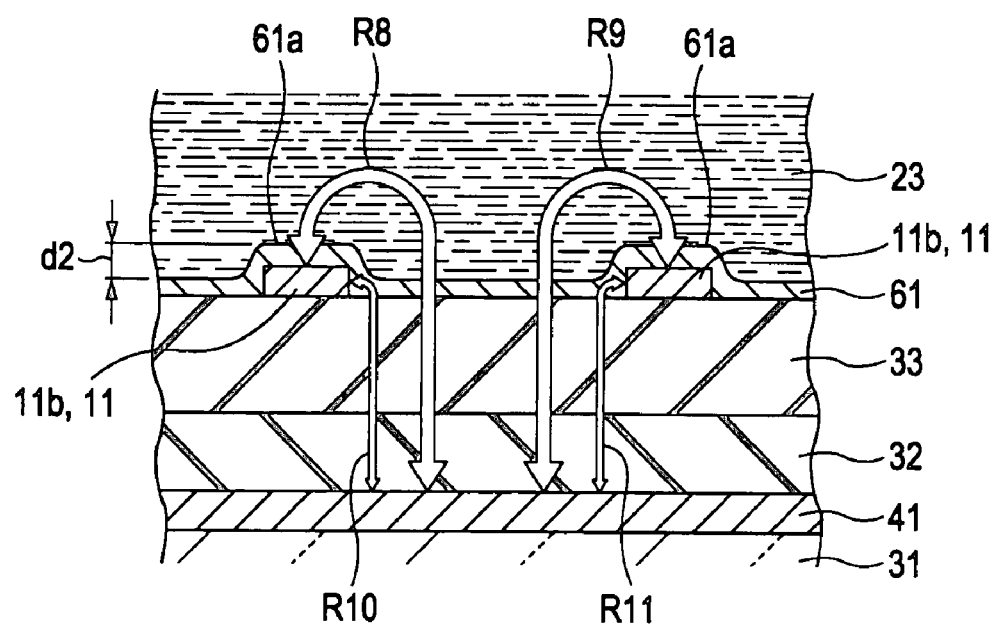

At this time, the electric field generated between the pixel electrodes 11 and the common electrode 41 will be described with reference to the drawings. FIG. 5A is a view explaining a path of the electric field generated between the pixel electrode and the common electrode in the liquid crystal display device 1, and FIG. 5B is a view explaining a path of the electric field generated between the pixel electrode and the common electrode in the liquid crystal display device having an alignment film having a thickness smaller than that of the pixel electrode. Arrows of FIG. 5 indicate the electric fields and a thick arrow indicates a strong electric field.

When a voltage is applied between the pixel electrode 11 and the common electrode 41, the electric field is generated in directions denoted by arrows R4 to R7 and arrows R8 and R11, as shown in FIGS. 5A and 5B. The step difference portion 34a is formed in the alignment films 34 and 61 by the fine step difference structure of the pixel electrode 11. The intensity of the electric field generated between the pixel electrode 11 and the common electrode 41 is increased with increasing proximity to the step difference portions 34a and 61a. Accordingly, the amount of charges collected in the interface between the liquid crystal layer 23 and the alignment films 34 and 61 by an AC component of the image signal is increased with increasing proximity to the step difference portions 34a and 61a.

In the liquid crystal display device 1, as shown in FIG. 5A, the thickness of the pixel electrode 11 is 55 nm or less, the thickness of the alignment film 34 is 80 nm to 125 nm, and the step difference ds of the upper surface of the alignment film 34 is less than 15 nm. Accordingly, the step difference d1 of the step difference portion 34a formed by the band shape electrode 11b is smaller than the step difference d2 of the step difference portion 61a of the alignment film 61 having the thickness smaller than that of the pixel electrode 11 shown in FIG. 5B. Accordingly, the flatness of the alignment film 34 is further improved compared with that of the alignment film 61 and thus the rubbing process is more uniformly performed.

Since the thickness of the alignment film 34 is 80 nm to 125 nm, the upper surface of the alignment film 34 becomes flat. Since the thickness of the alignment film 34 is less than 300 nm, a lateral electric field having a sufficient intensity is generated in the liquid crystal layer 23 when the voltage is applied between the pixel electrode 11 and the common electrode 41.

The image signal supplied to the pixel electrode 11 through the TFT element 12 is an AC signal. Accordingly, charges are collected in the interface between the members provided in the path of the electric field generated between the pixel electrode 11 and the common electrode 41. In addition, since the interface between the liquid crystal layer 23 and the alignment films 34 and 61 is charged, an alignment regulating force applied to the liquid crystal molecules by the alignment films 34 and 61 is reduced.

At this time, since the flatness of the alignment film 34 is higher than that of the alignment film 61 and the upper surface of the alignment film 34 is uniformly subjected to the rubbing process, the alignment regulating force of the step difference portion of the alignment film 34 is higher than that of the alignment film 61. Accordingly, since the sufficient alignment regulating force is applied to the step difference portion of the alignment film 34 by the uniform rubbing process although the alignment regulating force is reduced by charging the interface between the liquid crystal layer 23 and the alignment film, the alignment regulating force applied to the liquid crystal molecules is sufficiently ensured. Accordingly, it is possible to suppress display burn-in due to lack of the alignment regulating force. When the thickness of the alignment film 34 is larger than that of the pixel electrode 11 contacting the alignment film 34, the flatness can be improved by leveling effect of the organic material when the alignment film 34 covering the pixel electrode 11 is coated on the step difference between a region in which the pixel electrode 11 is formed and a region in which the pixel electrode 11 is not formed. That is, since the thickness of the alignment film 34 is larger than that of the pixel electrode 11 contacting the alignment film 34, it is possible to reduce irregularities of the surface in the region in which the pixel electrode 11 is formed and the region in which the pixel electrode 11 is not formed. Accordingly, it is possible to provide a liquid crystal display device with reduced display burn-in and excellent display quality while ensuring the flatness of the surface of the alignment film 34.

When a difference exists between the path of the electric field from the pixel electrode 11 to the common electrode 41 and the path of the electric field from the common electrode 41 to the pixel electrode 11, charges may be collected by a DC component due to different work functions of the members provided in the path. In addition, an alignment regulation failure of the liquid crystal molecules may occur due to charging and thus display burn-in may occur. The amount of charges collected by the DC component in the liquid crystal display device having the alignment film 61 having a small thickness is smaller than that of the liquid crystal display device 1, because the difference of the path is increased as the thickness of the alignment film is increased. However, since the charging due to the DC component is reduced by stopping the application of the voltage between the pixel electrode 11 and the common electrode 41, a large problem is not caused compared with the charging due to the AC component.

Electronic Apparatus

Figure 6:
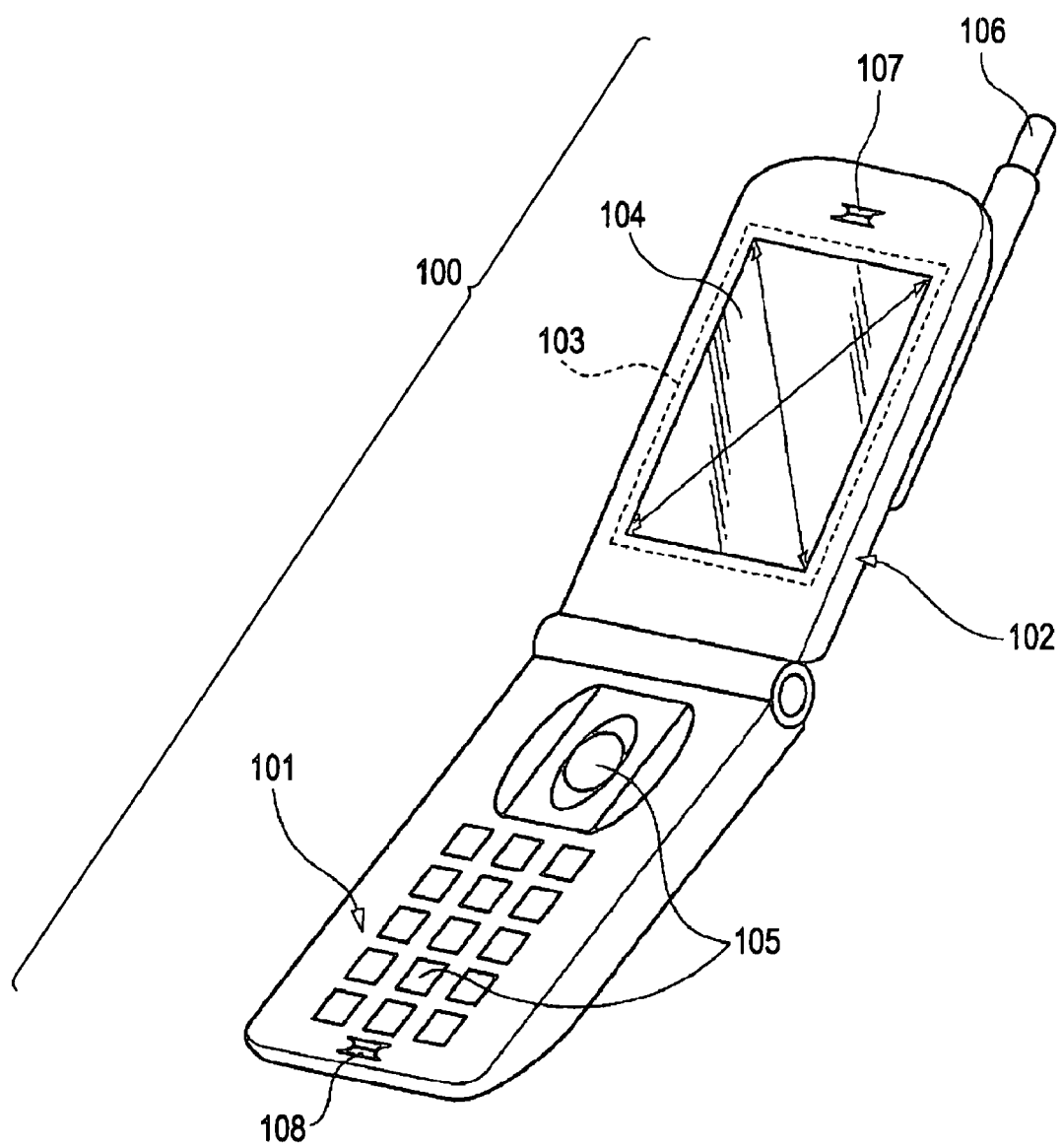
FIG. 6 is an appearance perspective view showing a mobile telephone.

Next, an electronic apparatus including the liquid crystal display device 1 having the above-described configuration will be described. FIG. 6 is an appearance perspective view showing a mobile telephone which is an electronic apparatus including the liquid crystal display device according to the invention.

The electronic apparatus according to the present embodiment is the mobile telephone 100 which has a main body 101 and an openable display body 102, as shown in FIG. 6. A display device 103 is provided inside the display body 102 and a variety of displays relating to telephone communication can be viewed on a display screen 104. Operation buttons 105 are arranged on the main body 101.

An antenna 106 is extendably attached to one end of the display body 102. A speaker (not shown) is mounted in an ear piece 107 provided at the upper side of the display body 102. A microphone (not shown) is mounted in a mouthpiece 108 provided at the lower side of the main body 101.

The liquid crystal display device 1 shown in FIG. 1 is used as the display device 103.

As described above, according to the liquid crystal display device 1 and the mobile telephone 100 including the same according to the present embodiment, it is possible to improve the flatness of the alignment film 34 to solve the alignment regulation failure and to reduce display burn-in, by increasing the thickness of the alignment film 34 to be larger than that of the pixel electrode 11. Here, the thickness of the pixel electrode 11 is 55 nm or less, the thickness of the alignment film 34 is 80 nm to 125 nm, and the step difference ds of the upper surface of the alignment film 34 is less than 15 nm. Accordingly, the flatness of the alignment film 34 is further improved, display burn-in is further suppressed, and a lateral electric field having a sufficient intensity can be generated in the liquid crystal layer 23.

In particular, since the pixel electrode 11 and the common electrode 41 has the FFS system electrode structure and the electric field generated between the pixel electrode 11 and the common electrode 41 is large in the step difference portion of the alignment film 34, a sufficient alignment regulating force is applied to the step difference portion 34a such that display burn-in can be more efficiently suppressed.

Second Embodiment

Figure 7:
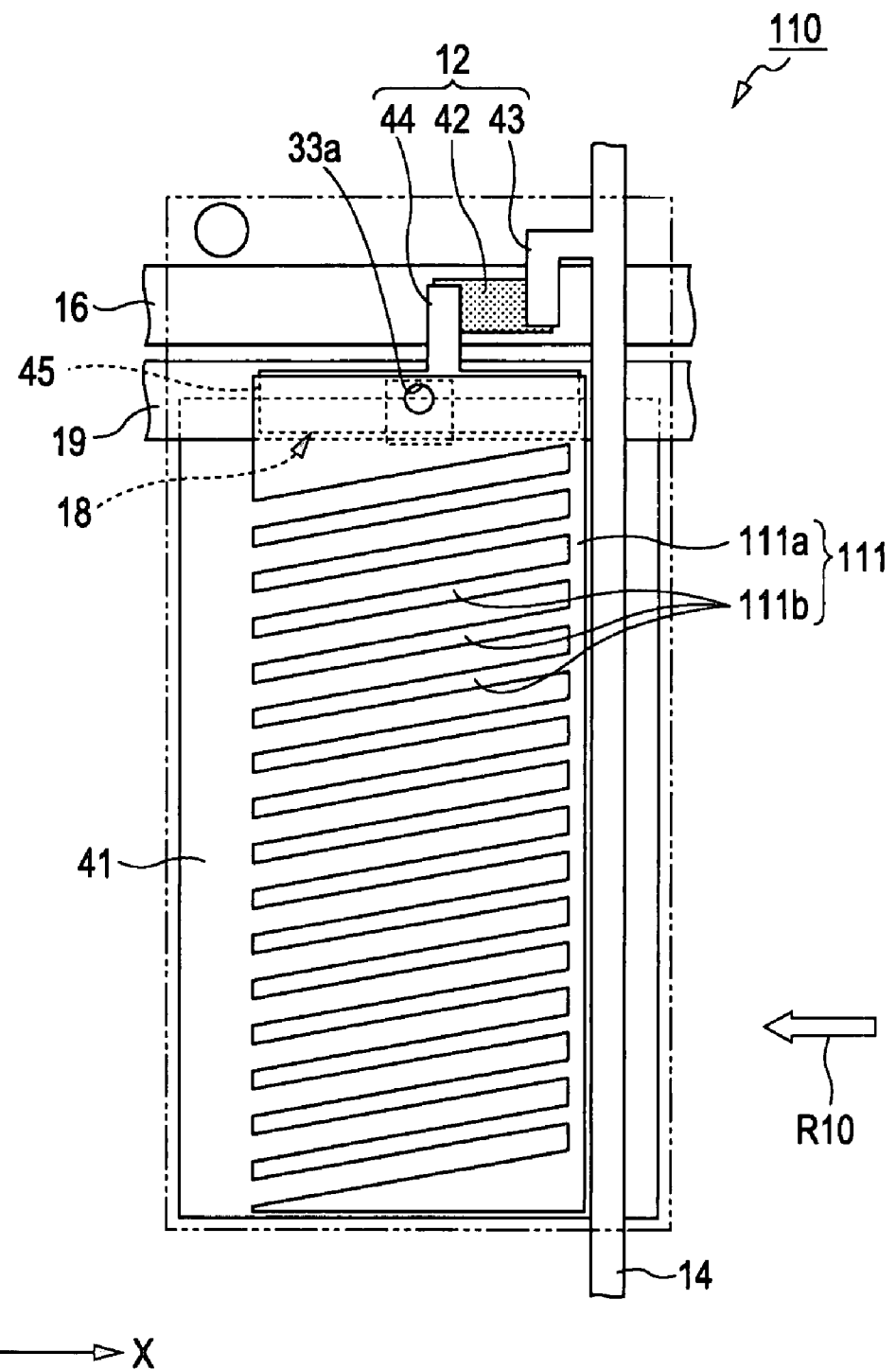
FIG. 7 is a plan view showing a sub pixel region of a liquid crystal display device according to a second embodiment of the invention.

Next, a liquid crystal display device according to a second embodiment of the invention will be described with reference to the accompanying drawings. Since the present embodiment is different from the first embodiment in the configuration of the pixel electrode, the second embodiment will be described concentrating on the configuration of the pixel electrode. The components described in the first embodiment are denoted by same reference numerals and thus the description thereof will be omitted. FIG. 7 is a partial enlarged plan view showing a sub pixel region of the liquid crystal display device according to the second embodiment of the invention.

In the liquid crystal display device 110 according to the present embodiment, as shown in FIG. 7, a pixel electrode 111 has substantially a comb shape in plan view. That is, the pixel electrode 111 includes a band-shaped connection portion 111a and a plurality (fifteen) of band-shaped electrodes 111b which are branched from the connection portion 111a and are parallel to one another.

The connection portion 111a is provided close to the data line 14 and is substantially provided in the Y-axis direction.

The band-shaped electrodes 111b substantially extend in the X-axis direction and are provided with a gap therebetween in the Y-axis direction. Ends of the band-shaped electrodes 111b close to the data line 14 are connected to the connection portion 111a and the other end of each of the band-shaped electrodes 111b separated from the data line 14 is an open end. Accordingly, the gap between the plurality of band-shaped electrodes 111b is opened at the side separated from the data line 14 toward another sub pixel region adjacent to the −X side.

The thickness of the alignment film (not shown) covering the pixel electrode is larger than the thickness of the pixel electrode 111.

Even in the liquid crystal display device 110 having the above-described configuration, the above-described operation and effect are obtained. In addition, since the ends of the band-shaped electrodes 111b separated from the data line 14 are opened in the gap formed between the plurality of band-shaped electrodes 111b, an aperture ratio is enhanced.

In the structure of the pixel electrode 111, when the rubbing process of the alignment film is performed from the +X side close to the data line 14 to the −X side separated from the data line 14 as denoted by an arrow R10 shown in FIG. 7, step differences formed by the band-shaped electrodes 111b form shadow in a region of the alignment film covering the ends of the band-shaped electrodes 111b separated from the connection portion 111a. Accordingly, an alignment failure may occur. However, when the thickness of the alignment film is larger than that of the pixel electrode 111, it is possible to perform an alignment process even in the shadow region and to suppress the occurrence of the alignment failure.

Third Embodiment

Figure 8:
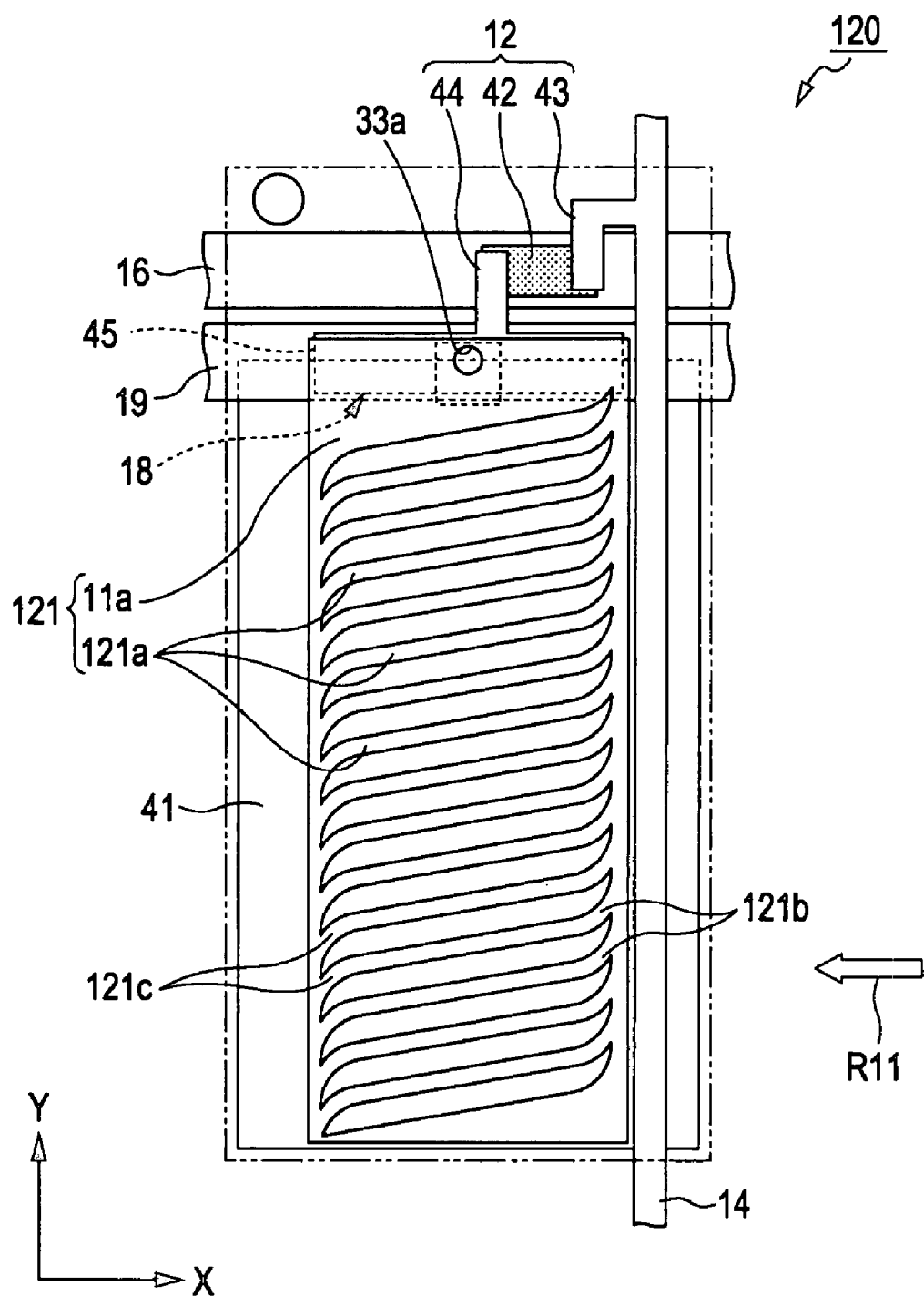
FIG. 8 is a plan view showing a sub pixel region of a liquid crystal display device according to a third embodiment of the invention.

Next, a liquid crystal display device according to a third embodiment of the invention will be described with reference to the accompanying drawings. Since the present embodiment is different from the first embodiment in the configuration of the pixel electrode, the third embodiment will be described concentrating on the configuration of the pixel electrode. The components described in the first embodiment are denoted by same reference numerals and thus the description thereof will be omitted. FIG. 8 is a partial enlarged plan view showing a sub pixel region of the liquid crystal display device.

In the liquid crystal display device 120 according to the present embodiment, as shown in FIG. 8, a pixel electrode 121 includes a frame portion 11a having substantially a trapezoidal shape in plan view and a plurality of band-shaped electrodes 121a.

Curved portions 121b and 121c are formed in both ends of the band-shaped electrodes 121a connected to the frame portion 11a. The curved portions 121b are formed at one ends of the band-shaped electrodes 121a close to the data line 14 and are curved to be close to the scan line 16 with increasing proximity to the data line 14 compared with a central line of a central portion of the band-shaped electrodes 121a. The curved portions 121c are formed at the other ends of the band-shaped electrodes 121a separated from the data line 14 and are curved to be separated from the scan line 16 as being separated from the data line 14 compared with the central line of the central portion of the band-shaped electrodes 121a.

The thickness of the alignment film (not shown) covering the pixel electrode 121 is larger than that of the pixel electrode 121.

Even in the liquid crystal display device 120 having the above-described configuration, the above-described operation and effect are obtained. In addition, since the curved portions 121b and 121c are formed at the both ends of the band-shaped electrodes 121a, a display failure such as a reverse twist domain is reduced.

In the structure of the pixel electrode 121, when the rubbing process of the alignment film is performed from the +X side close to the data line 14 to the −X side separated from the data line 14 as denoted by an arrow R11 shown in FIG. 8, step differences formed by the curved portions 121b form shadow in a region of the alignment film covering the curved portions 121b. Accordingly, an alignment failure may occur. However, when the thickness of the alignment film is larger than that of the pixel electrode 121, it is possible to perform an alignment process even in the shadow region and to suppress the occurrence of the alignment failure.

Fourth Embodiment

Figure 9:
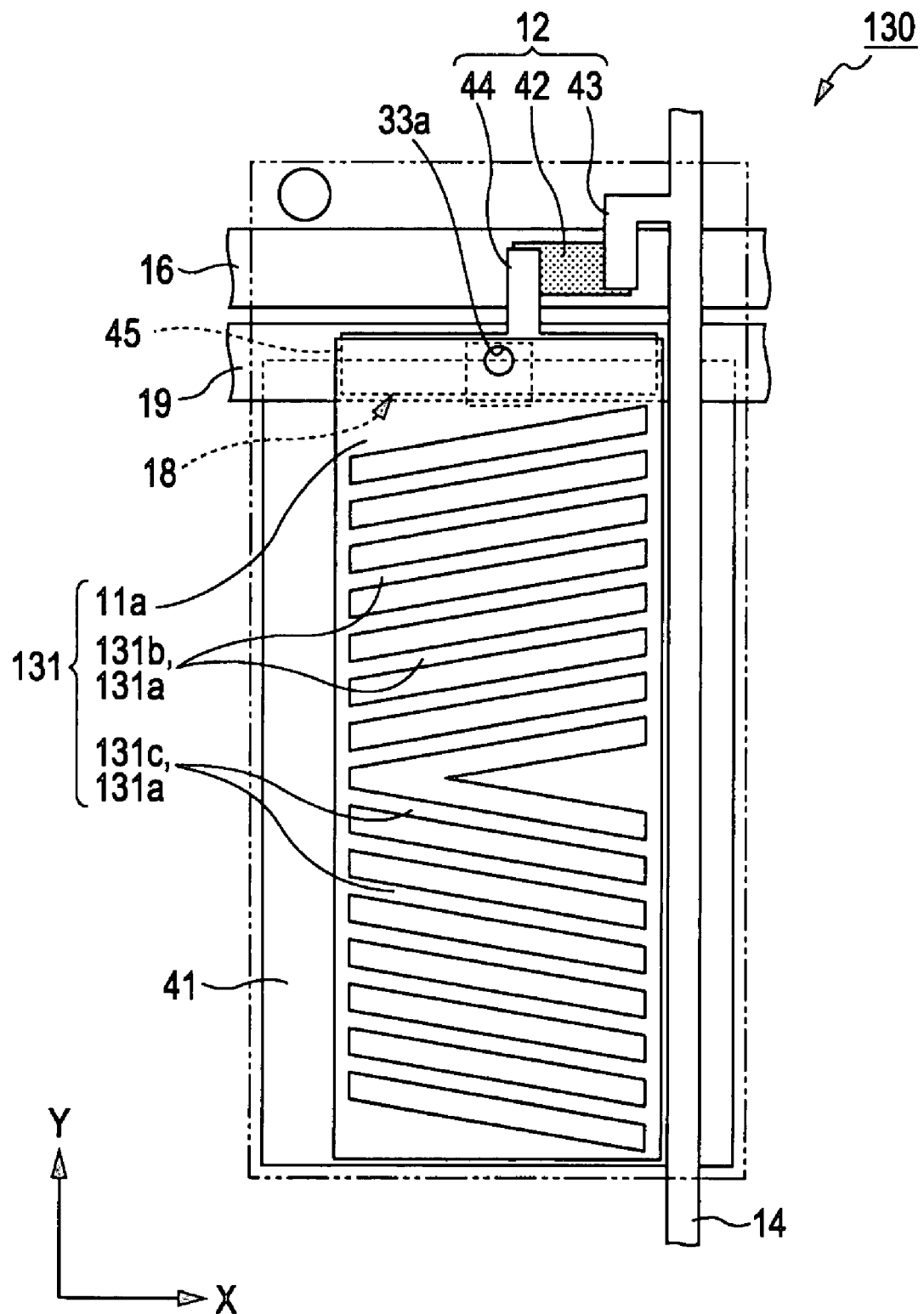
FIG. 9 is a plan view showing a sub pixel region of a liquid crystal display device according to a fourth embodiment of the invention.

Next, a liquid crystal display device according to a fourth embodiment of the invention will be described with reference to the accompanying drawings. Since the present embodiment is different from the first embodiment in the configuration of the pixel electrode, the fourth embodiment will be described concentrating on the configuration of the pixel electrode. The components described in the first embodiment are denoted by same reference numerals and thus the description thereof will be omitted. FIG. 9 is a partial enlarged plan view showing a sub pixel region of the liquid crystal display device.

In the liquid crystal display device 130 according to the present embodiment, as shown in FIG. 9, a pixel electrode 131 has a multi-domain structure. That is, the extension directions of band-shaped electrodes 131a configuring the pixel electrode 131 is different from each other between one half region close to the scan line 16 and the other half region separated from the scan line 16 in the sub pixel region.

Among the plurality of band-shaped electrodes 131a, band-shaped electrodes 131b formed in the half region close to the scan line 16 extend away from the scan line 16 with increasing distance from the data line 14. Among the plurality of band-shaped electrodes 131a, band-shaped electrodes 131c formed in the half region separated from the scan line 16 extend towards to the scan line 16 with increasing distance from the data line 14.

Even in the liquid crystal display device 130 having the above-described configuration, the above-described operation and effect are obtained. In addition, the pixel electrode 131 according to the present embodiment may include a main portion and band-shaped electrodes similar to the second embodiment or may include curved portions formed at both ends of band-shaped electrodes similar to the third embodiment.

Fifth Embodiment

Figure 10:
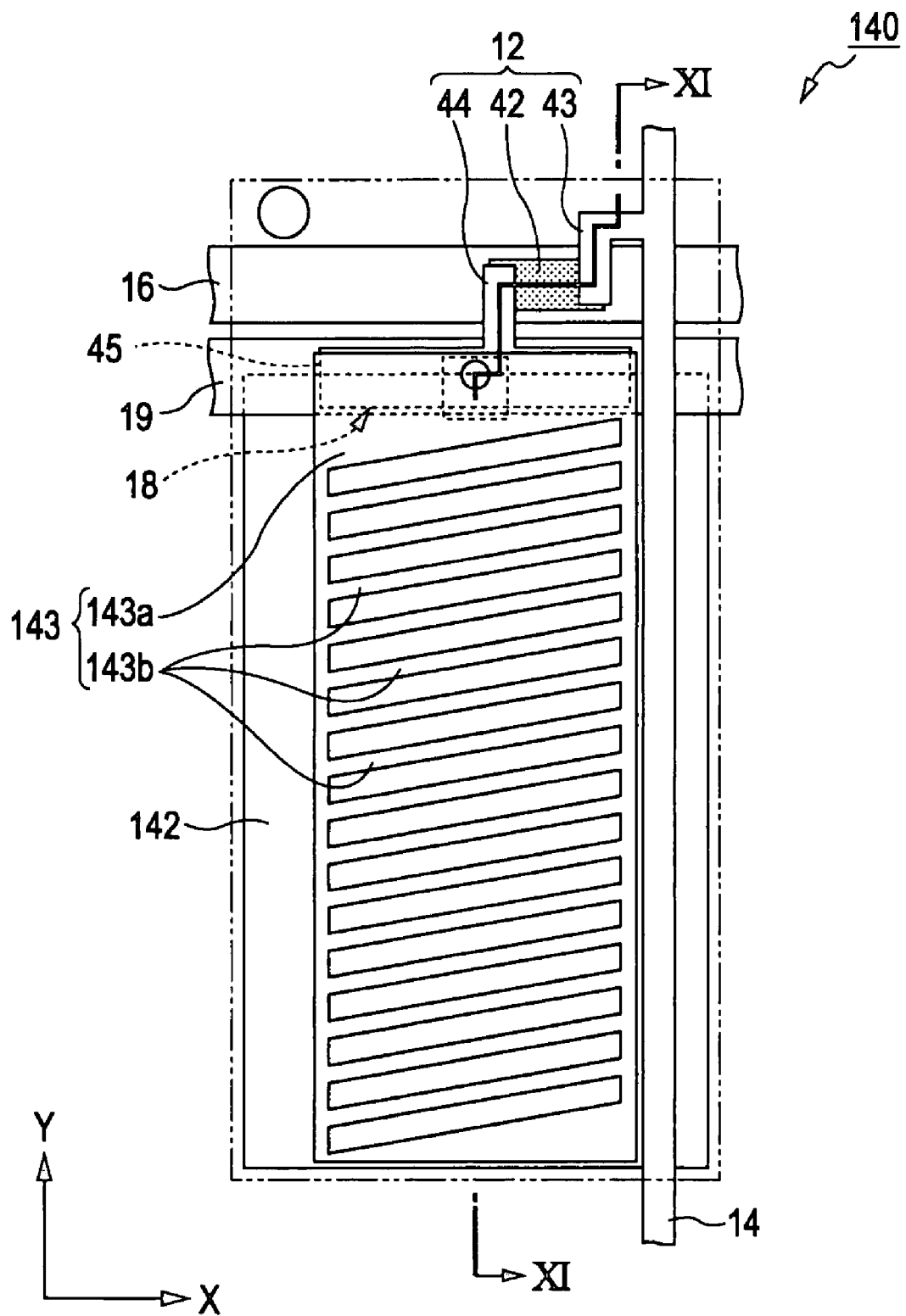
FIG. 10 is a plan view showing a sub pixel region of a liquid crystal display device according to a fifth embodiment of the invention.

Next, a liquid crystal display device according to a fifth embodiment of the invention will be described with reference to the accompanying drawings. Since the present embodiment is different from the first embodiment in the configuration of the pixel electrode, the fourth embodiment will be described concentrating on the configuration of the pixel electrode. The components described in the first embodiment are denoted by same reference numerals and thus the description thereof will be omitted. FIG. 10 is a partial enlarged plan view showing a sub pixel region of the liquid crystal display device and FIG. 11 is a cross-sectional view taken along line XI-XI of FIG. 10.

Figure 11:
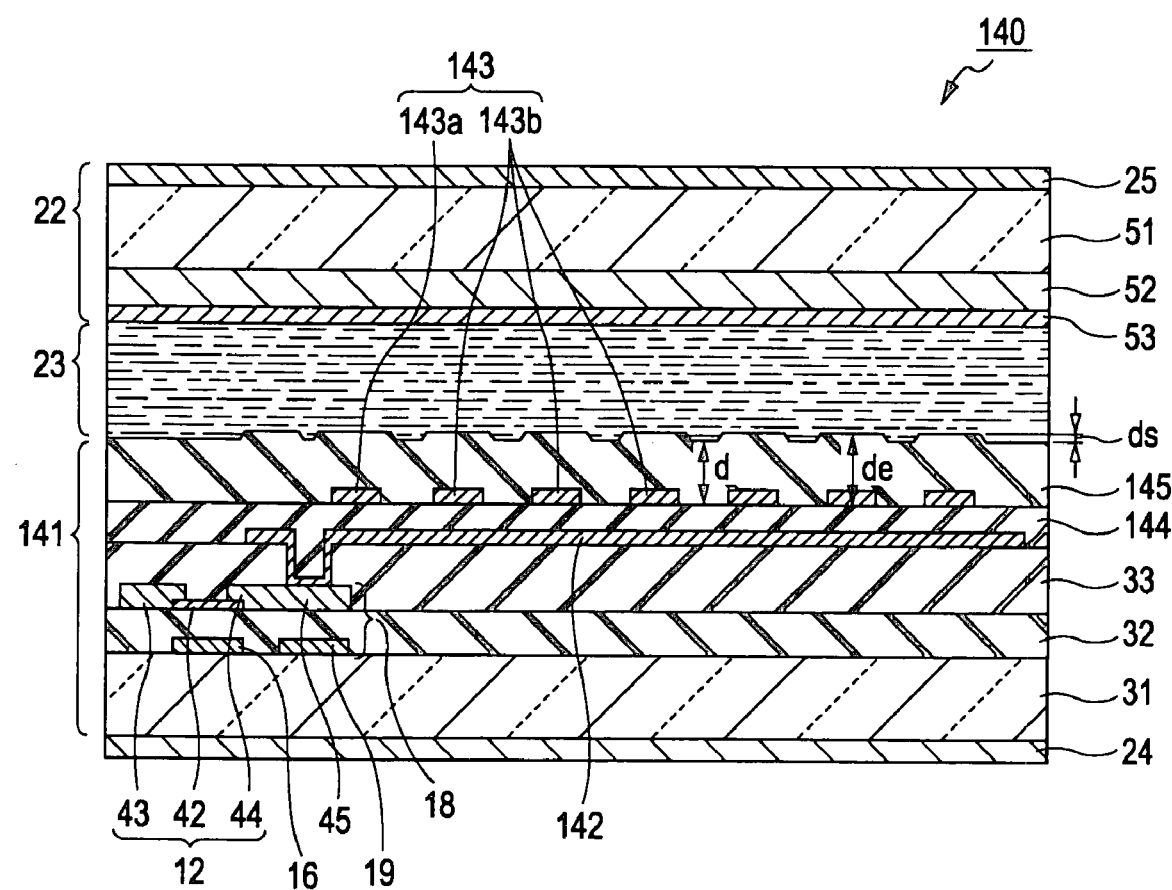
FIG. 11 is a cross-sectional view taken along line XI-XI of FIG. 10.

In the liquid crystal display device 140 according to the present embodiment, as shown in FIGS. 10 and 11, a pixel electrode 142 provided on a device substrate 141 is provided under a common electrode 143. That is, as shown in FIG. 11, the device substrate 141 includes the substrate body 31, and the gate insulating film 32, the interlayer insulating film 33, an inter-electrode insulating film (insulating layer) 144 and an alignment film 145, all of which are sequentially laminated on the inner surface of the substrate body 31.

The device substrate 141 includes the scan line 16 and the capacitive line 19, both of which are provided on the inner surface of the substrate body 31; the data line 14 (shown in FIG. 10), the semiconductor layer 42, the source electrode 43, the drain electrode 44 and the capacitive electrode 45, all of which are provided on the inner surface of the gate insulating film 32; the pixel electrode 142 provided on the inner surface of the interlayer insulating film 33, and the common electrode 143 provided on the inner surface of the inter-electrode insulating film 144.

The inter-electrode insulating film 144 is formed of a light-transmissive material having an insulating property, such as silicon nitride or silicon oxide and is provided so as to cover the pixel electrode 142 formed on the interlayer insulating film 33.

The pixel electrode 142 extends in a band shape in the X-axis direction shown in FIG. 10 in plan view. The pixel electrode 142 is connected to the capacitive electrode 45 through a contact hole formed in the interlayer insulating film 33. Accordingly, the pixel electrode 142 is connected to the drain of the TFT element 12.

The common electrode 143 has substantially a trapezoidal shape in plan view and includes a frame portion 143a having a rectangular shape in plan view and the plurality (fifteen) of band-shaped electrodes (band-shaped portions) 143b which substantially extend in the X-axis direction and are parallel to one another with a gap therebetween in the Y-axis direction. Both ends of the band-shaped electrodes 143b are connected to portions of the frame portion 143a which extend in the Y-axis direction.

Even in the liquid crystal display device 140 having the above-described configuration, the above-described operation and effect are obtained. In addition, when the thickness of the common electrode 143 is increased to reduce the resistance of the common electrode 143, it is possible to suppress an alignment failure of the alignment film 145.

In addition, the pixel electrode 142 according to the present embodiment may include a main portion and band-shaped electrodes similar to the second embodiment or may include curved portions formed at both ends of band-shaped electrodes similar to the third embodiment. The pixel electrode 142 may have a multi-domain structure similar to the fourth embodiment.

Embodiment 1

The step difference of the alignment film due to the thickness of the alignment film and the thickness of the pixel electrode or the common electrode, occurrence of display burn-in due to the AC component of the image signal, and the liquid crystal driving voltage are shown Table 1 as Embodiments 1 to 7 and Comparative Examples 1 to 3. In Table 1, a case where display burn-in occurs is denoted by "x", a case where display burn-in hardly occurs is denoted by "○", and a case where display burn-in does not completely occur is denoted by "⊙". In Table 1, a case where a lateral electric field having a sufficient intensity is generated in the liquid crystal layer when a voltage is applied between the pixel electrode and the common electrode is denoted by "○" and a case where the lateral electric field having the sufficient intensity is not generated is denoted by "x". In Embodiments 1 to 4 and 7 and Comparative Examples 1 to 3, the pixel electrode is provided to be closer to the liquid crystal layer than the liquid crystal layer and the alignment film covers the pixel electrode. Similarly, in Embodiments 5 and 6, the common electrode is provided to be closer to the liquid crystal layer than the pixel electrode and the alignment film covers the common electrode.

TABLE 1

| | Thickness of alignment film [nm] | Thickness of electrode [nm] | Step difference [nm] | AC Burn-in | Liquid crystal driving voltage |
|---|---|---|---|---|---|
| Embodiment 1 | 120 | Pixel electrode: 100 | 40 | ○ | ○ |
| Embodiment 2 | 50 | Pixel electrode: 30 | 20 | ○ | ○ |
| Embodiment 3 | 125 | Pixel electrode: 55 | 15 | ⊙ | ○ |
| Embodiment 4 | 80 | Pixel electrode: 30 | 8 | ⊙ | ○ |
| Embodiment 5 | 80 | Common electrode: 60 | 20 | ○ | ○ |
| Embodiment 6 | 60 | Common electrode: 50 | 25 | ○ | ○ |
| Embodiment 7 | 150 | Pixel electrode: 100 | 55 | ○ | ○ |
| Comparative Example 1 | 40 | Pixel electrode: 100 | 80 | X | ○ |
| Comparative Example 2 | 100 | Pixel electrode: 100 | 60 | X | ○ |
| Comparative Example 3 | 300 | Pixel electrode: 50 | 5 | ⊙ | X |

As shown in Table 1, when the thickness of the alignment film is larger than that of the pixel electrode, the flatness can be improved by the leveling effect of the organic material when the alignment film covering the electrode is coated on the step difference between the region in which the electrode is formed and the region in which the electrode is not formed. When the thickness of the pixel electrode is 100 nm or less, the thickness of the alignment film is 40 nm to 150 nm, and the step difference ds of the upper surface of the alignment film is less than 60 nm, the flatness of the alignment film is further improved and thus display burn-in is further suppressed. When the thickness of the pixel electrode is 55 nm or less, the thickness of the alignment film is 80 nm to 125 nm, and the step difference ds of the upper surface of the alignment film is less than 15 nm, the flatness of the alignment film is further improved and thus display burn-in is further suppressed. When the thickness of the alignment film is less than 300 nm, it is possible to generate an electric field having a sufficient intensity in the liquid crystal layer.

The invention is not limited to the above-described embodiments and may be variously changed without departing from the scope of the invention.

For example, the shape of any one electrode, which is provided at the side of the liquid crystal layer, of the pixel electrode and the common electrode may have any shape such as substantially a comb shape in plan if an electric field generated between the pixel electrode and the common electrode passes through the liquid crystal layer.

Although the common electrode is formed on the device substrate together with the scan line and the capacitive line, the common electrode may be provided on a layer different from the scan line and the capacitive line if the common electrode and the pixel electrode are provided with the insulating film interposed therebetween.

The thickness of the pixel electrode is 55 nm or less and the thickness of the alignment film is 80 nm to 125 nm. However, the thickness of the alignment film is only larger than that of the pixel electrode if a lateral electric field having a sufficient intensity can be generated in the liquid crystal layer. Accordingly, when the thickness of the alignment film is larger than that of the pixel electrode, the thickness of the alignment film may be equal to or less than twice the thickness of the pixel electrode. Similarly, if the step difference ds of the upper surface of the alignment film may not be less than, for example, 60 nm or 15 nm if the thickness of the alignment is larger than that of the pixel electrode.

When the liquid crystal display device is used in, for example, a monitor of a television set and the thickness of any one electrode, which is provided at the side of the liquid crystal layer, of the pixel electrode and the common electrode is 100 nm or less, the thickness of the alignment film may be 120 nm or more. When the liquid crystal display device is used in, for example, a display unit of a mobile telephone and the thickness of any one electrode is 70 nm or less, the thickness of alignment film may be 80 nm or more. When the thickness of any one electrode is 50 nm or less, the thickness of alignment film may be 100 nm or more and, when the thickness of any one electrode is 30 nm or less, the thickness of alignment film may be 80 nm or more.

When the thickness of the alignment film is larger than that of the electrode contacting the alignment film, the flatness can be improved by the leveling effect of the organic material when the alignment film covering the electrode is coated on the step difference between the region in which the electrode is formed and the region in which the electrode is not formed. When the thickness of the alignment film is larger than that of the electrode contacting the alignment film, irregularities of the surface between the region in which the electrode is formed and the region in which the electrode is not formed can be reduced and a liquid crystal display device with reduced display burn-in and excellent display quality while ensuring the flatness of the surface of the alignment film can be provided. When the surface of the alignment film becomes flat, it is possible to prevent display unevenness of the obtained image. Even in a high-precision liquid crystal display device in which the width of the electrode and a line space between the electrodes are about several μm by reducing the area of each pixel in order to realize high-precision image display, it is possible to reduce irregularities of the surface of the alignment film and to reduce influence display unevenness of the image.

Although the TFT element is used as a driving element for switching the pixel electrode, the driving element is not limited to the TFT element and other driving elements such as a thin-film diode (TFD) element may be used.

The liquid crystal display device is not limited to the FFS system liquid crystal display device and may be other lateral electric field driving system liquid crystal display device such as an IPS system liquid crystal display device. In the IPS system liquid crystal display device, the pixel electrode and the common electrode have band-shaped electrodes and have substantially a comb shape in plan view. The pixel electrode and the common electrode are provided such that the band-shaped electrodes are engaged with each other. The gap between the band-shaped electrodes configuring the pixel electrode is smaller than the thickness of the liquid crystal layer or the width of the band-shaped electrodes. By this configuration, the pixel electrode and the common electrode configure the electrode structure of the IPS system.

If at least one of the pixel electrode and the common electrode contacts the alignment film, the pixel electrode and the common electrode may be formed on the same layer, that is, the interlayer insulating film or the substrate body or any one of the pixel electrode and the common electrode may be formed on the interlayer insulating film and the other thereof may be formed on the substrate body similar to the electrode structure of the FFS system.

The liquid crystal display device is not limited to the normally black mode and a normally white mode may be employed by changing the transmission axis of the polarization plate.

Although the liquid crystal display device is a transmissive display device, a semi-transmissive reflective liquid crystal display device or a reflective liquid crystal display device may be employed.

Although the liquid crystal display device is a color liquid crystal display device for displaying three colors of R, G and B, a monochromic display device for displaying one color of any one of R, G and B or another color or a display device for displaying two colors or four colors or more may be used. A color filter layer may not be provided on the counter substrate. The color filter layer may not be provided on the counter substrate and may be provided on the device substrate.

The electronic apparatus is not limited to the mobile telephone if the liquid crystal display device is included, and an notebook type computer a personal computer, a digital camera, a liquid crystal television set, a viewfinder-type or direct-view monitor type video tape recorder, a car navigation system, a pager, an electronic organizer, an electronic calculator, a word processor, a workstation, a videophone, a POS terminal, or a touch-panel-equipped device may be used.

What is claimed is:

1. A liquid crystal display device in which a plurality of electrodes is provided on one of a plurality of substrates with a liquid crystal layer interposed therebetween and liquid crystal molecules configuring the liquid crystal layer are driven by an electric field generated between a pair of the electrodes,
    wherein the one substrate has an alignment film which contacts the liquid crystal layer to regulate an alignment direction of the liquid crystal molecules and is provided so as to cover at least one of the pair of electrodes,
    wherein a thickness of the one electrode contacting the alignment film is 30 nm to 55 nm, and a thickness of the alignment film is 80 nm to 125 nm, and
    wherein an upper surface of the alignment film includes a step difference in areas above the plurality of electrodes, and the step difference is less than the thickness of the one electrode contacting the alignment film.

2. The liquid crystal display device according to claim 1, wherein a sum of the thickness of the one electrode contacting the alignment film and the thickness of the alignment film formed thereon less the thickness of the alignment film is less than or equal to 15 nm.

3. The liquid crystal display device according to claim 1,
    wherein the one electrode contacting the alignment film has a plurality of band-shaped portions electrically connected to each other, and
    wherein the other electrode of the pair of electrodes includes a plane region in which the one electrode is formed, has a larger area than the one electrode, and is opposed to the one electrode with an insulating layer interposed therebetween.

4. The liquid crystal display device according to claim 3, wherein the one electrode has a connection portion for connecting one end of each of the plurality of band-shaped portions with one another, and wherein the other end of each of the plurality of band-shaped portions is an open end.

5. The liquid crystal display device according to claim 3, wherein curved portions, which become further away from a central line of a central portion with increasing proximity to both ends of the band-shaped portions, are formed at the both ends of the band-shaped portions.

6. An electronic apparatus comprising the liquid crystal display device according to claim 1.

7. The liquid crystal display device according to claim 1, wherein the at least one of the pair of electrodes is directly connected to a capacitive electrode, wherein a capacitive line is formed below the capacitive electrode, the capacitive electrode and capacitive line forming a storage capacitor, and wherein the capacitive electrode is directly connected to a drain of a TFT driving element.

8. The liquid crystal display device according to claim 1, wherein the one electrode contacting the alignment film includes a plurality of band-shaped electrodes having gaps therebetween, and the alignment film is provided in the gaps.

* * * * *